INVENTORS
LORUS J. MILNE
ARTHUR J. RAWSON
HALDAN K. HARTLINE

Aug. 4, 1953　　　L. J. MILNE ET AL　　　2,647,438
ADJUSTABLE HEADREST

Filed Aug. 19, 1949　　　　　　　　　　　4 Sheets-Sheet 4

INVENTORS
LORUS J. MILNE
BY ARTHUR J. RAWSON
HALDAN K. HARTLINE
ATTORNEY

Patented Aug. 4, 1953

2,647,438

UNITED STATES PATENT OFFICE 2,647,438

ADJUSTABLE HEADREST

Lorus J. Milne, Durham, N. H., Arthur J. Rawson, Rocky Springs, Md., and Haldan K. Hartline, Media, Pa., assignors, by mesne assignments, to the United States of America as represented by the Secretary of the Navy Application August 19, 1949, Serial No. 111,314

3 Claims. (Cl. 88—36)

The present invention relates to headrests for optical instruments, and more particularly to a novel headrest for range finders or similar binocular optical instruments, permitting more comfortable positioning of the head in the observation position and a more accurate positioning of the eyes of the observer with respect to the oculars of such instruments than has heretofore been possible.

In optical instruments of the binocular type requiring relatively prolonged periods of observation, there are two predominant disadvantages to the conventional headrests: the first is discomfort to the observer and the second is improper or insufficient means of accommodation to the eyes and vision of various observers while retaining accuracy of observation.

One object of the present invention is to afford to the user of said optical devices a comfortable headrest designed and constructed to be accommodated to various head sizes.

Another object of this invention is substantially to insure the proper positioning of the eyes of the user with respect to the oculars of said instrument to reduce errors such as parallax caused by improperly positioning the head.

A further object of this invention is to provide means for adjusting the headrest to accommodate for differences in vision of various observers, and yet substantially to insure proper observation without error in any adjusted position.

Still another object is to provide a headrest which will support the head of a user for long periods of time with a minimum of fatigue. To these ends the present device is constructed of such relatively adjustable parts as to accomplish the foregoing objects.

The present headrest comprises generally an adjustable supporting frame attached to the casing of the optical instrument, a pair of viewers or eyemasks, one for each eye, pivotally mounted on the frame, and a sponge rubber cushion overlying the viewers. The supporting frame consists of a hinged bracket arrangement enabling vertical and horizontal adjustment of the viewers with respect to the oculars of the instrument for obtaining proper sight of said oculars therethrough. The two viewers are linked together so they may take a V-form with a range of apex angles and yet remain symmetrically positioned with respect to the oculars at all times. Overlying said viewers is a sponge rubber cushion designed to accommodate the observer's head in the region of his eyes and having sight apertures therein substantially coinciding with the apertures of the viewers. In addition, the viewers are connected to the oculars by means of light-proof tubular cloths to prevent interference from extraneous light. Also, the hinged bracket arrangement is provided with two knurled adjusting screws cooperating to facilitate the vertical and horizontal adjustment mentioned above.

In using the present headrest, the observer rests his forehead and the upper portion of his face against the cushion, adjusts the viewers to the proper apex angle to fit his head, and then vertically and horizontally adjusts the viewers with relation to the oculars to accommodate the headrest to his vision. The user may thus obtain proper and consistent vision of the oculars with ease and comfort to both his eyes and head.

The foregoing is a general description of the invention which is described in detail below in conjunction with the accompanying drawings wherein.

Figure 1:
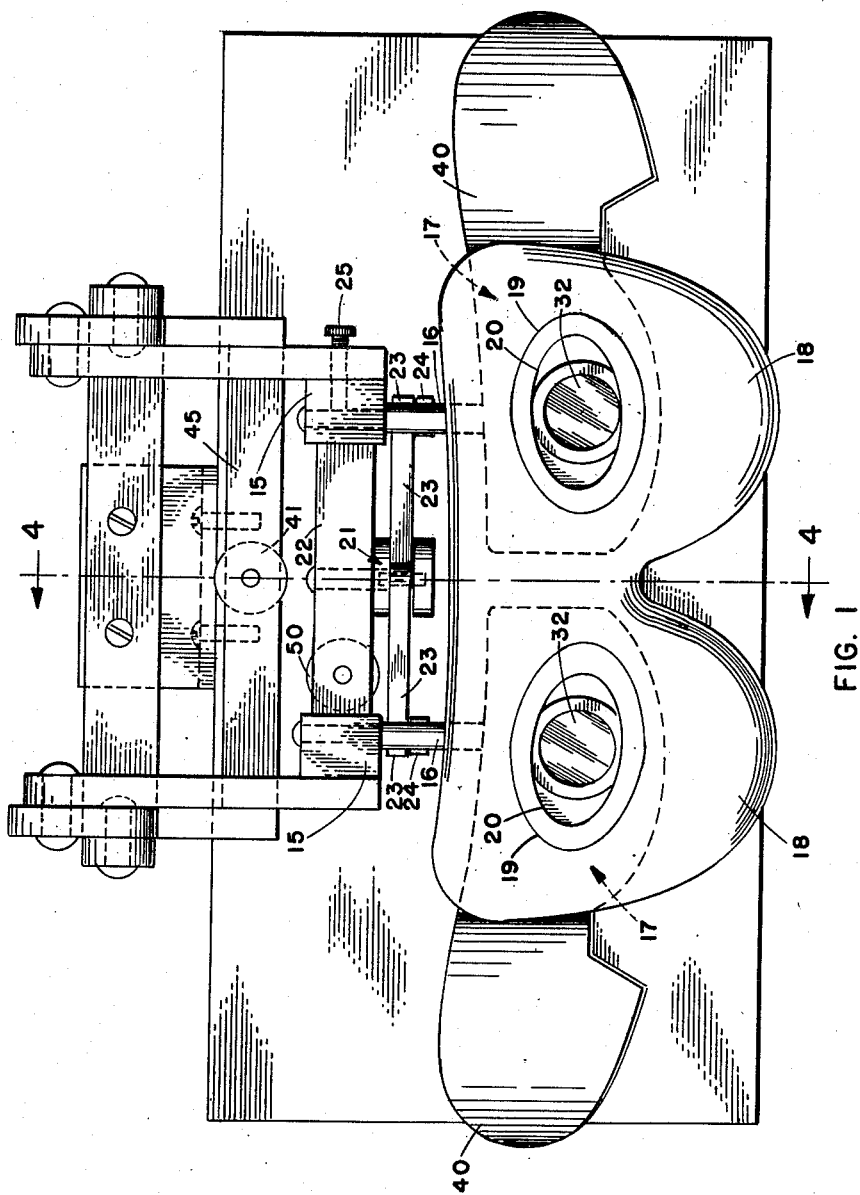
Fig. 1 is a top view of the headrest shown positioned on an optical instrument.
Figure 2:
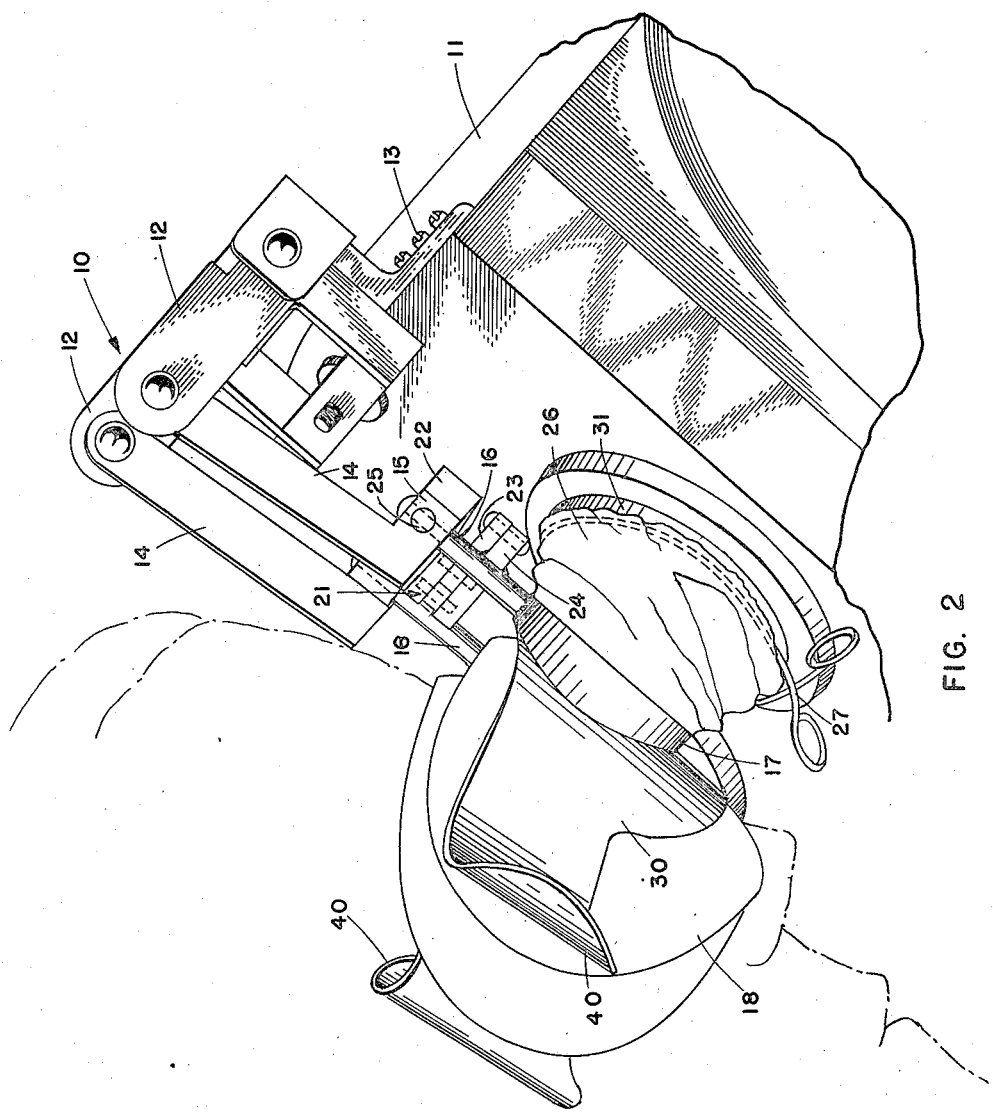
Fig. 2 is a side perspective view of the device shown in operative position upon an optical instrument.
Figure 3:
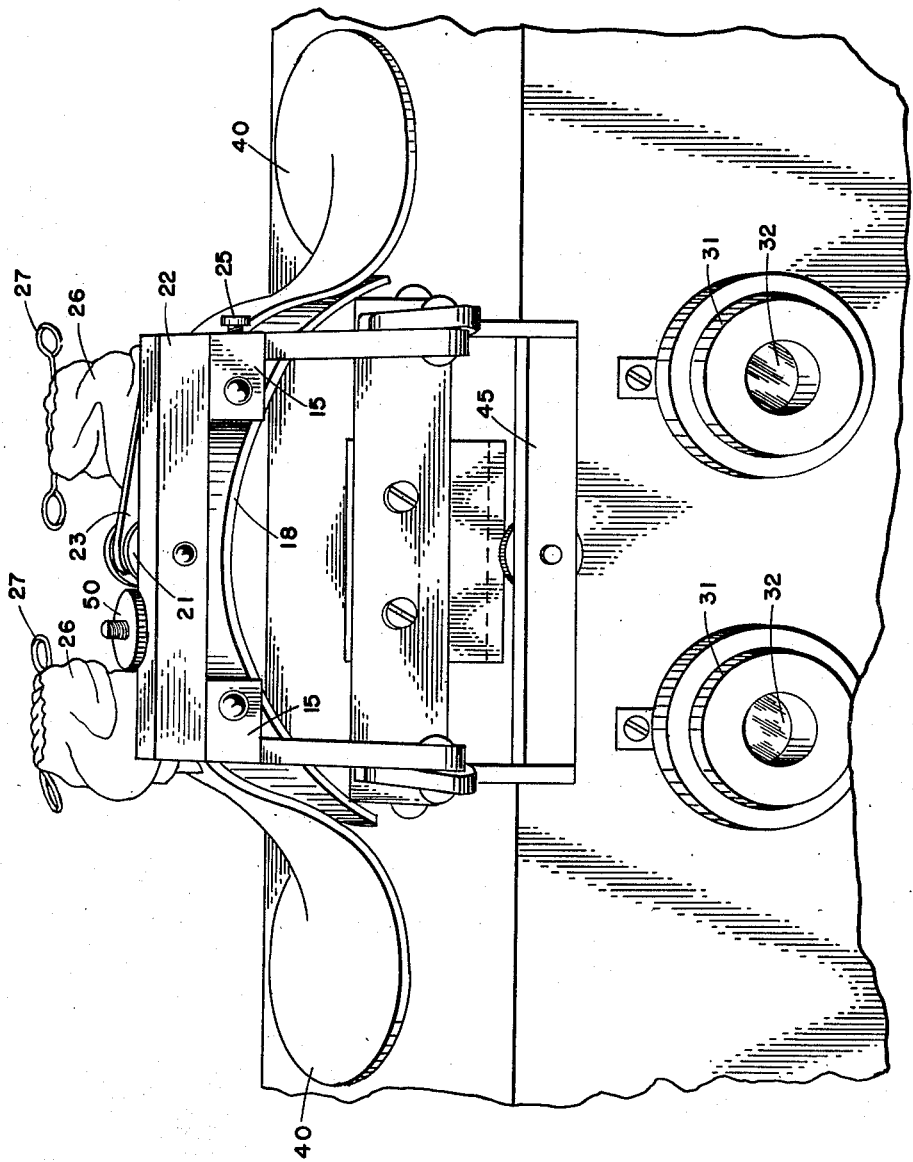
Fig. 3 is an elevation of the device shown turned back away from the oculars of the instrument.
Figure 4:
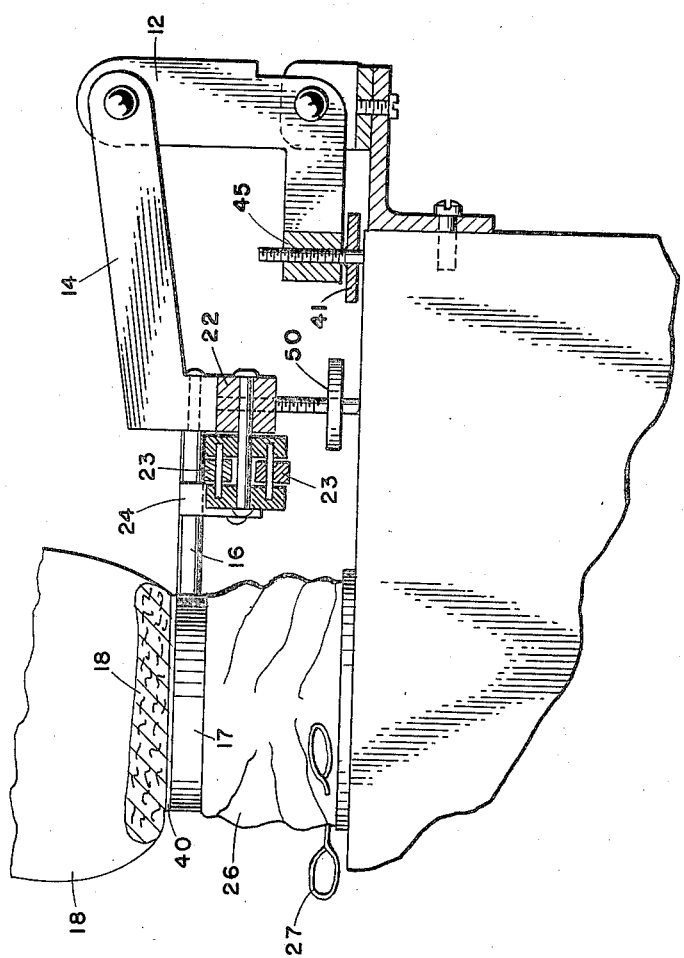
Fig. 4 is a cross section taken along line 4—4 of Fig. 1.

The supporting frame 10 of the present headrest is attached to the casing 11 of a range finder or similar binocular instrument by means of base 13. Brackets 12 are pivotally secured to said base and are pivotally hinged to brackets 14. These latter brackets have projections 15 for receiving pivot rods 16.

The viewers or eyemasks 17 and their associated cushion 18 are mounted on the frame through the pivot rods 16. The viewers are formed of sheet metal or other structural material, each substantially in the shape of one half of a pair of aviation goggles and designed to substantially conform to the shape of a head in the vicinity of the eyes. The upturned portions 30 of the viewers are turned outward to form wing-like portions 40 serving the dual function of providing handles for adjusting the apex angle of the viewers and preventing injury to the eyes of a user should he come down on the end of a viewer. The viewer for each eye is formed separately and mounted on its pivot rod 16. The cushion element 18, designed substantially to cover the face of the metal viewers is made of sponge rubber or other suitable material. Openings 19 are made in the cushion to coincide substantially with the sight openings 20 in each of the viewers 17.

As stated above, the viewers are shaped to conform substantially to the shape of a head in the region of the eyes, but in addition they are adjustable so as to conform to various head sizes and shapes. This is accomplished through the pivotability of rods 16 in their seats in elements 15, to which the viewers are affixed. In order that the sight apertures 20 in the viewers may be kept symmetrically positioned over the oculars of the instrument during pivotal adjustment of said viewers, the pivot rods are linked together for synchronous rotation. To this end a disk 21 is rotatably mounted on bar 22, which is supported by projections 15. Links 23 connect lugs 24 of rods 16 with the disk through pivotal connections therewith. Thus, pivoting of one viewer will cause a corresponding pivotal movement in the other viewer; hence, the viewing apertures 20 will remain symmetrically positioned over the instrument's oculars 32.

Once adjusted to suit a particular user of the instrument the viewers may be clamped against further pivotal movement by suitable means such as thumb screw 25 threaded into bracket 14, which when desired may be tightened against the pivot rod to prevent further movement thereof.

In addition to the pivotal adjustability above described, the viewers may as a unit be raised away from or lowered toward the instrument's oculars due to the pivotal relationship of the two sets of pivotal brackets, each set composed of corresponding brackets 12 and 14. The raising and lowering of the viewers is facilitated by means of thumb screws 50 through bar 22 and 41 through bar 45, the adjustment of the screws cooperating to accomplish both the vertical and horizontal adjustment of the viewing unit. Due to the distance of the viewers 17 from the pivot points of the brackets 12 and 14 each of the adjusted movements of the viewers relative to the oculars 32 about these pivot points approximates a straight line. The movement is arcuate but so slight that the portion of the arc through which the viewers 17 move in adjustment is effectively rectilinear and therefore the adjustment of the thumb screws 41 will cause the viewers to move in a line substantially perpendicular to the plane of the ocular lens axes and the adjustment of the thumb screw 50 will cause the viewers to move in a line substantially parallel to the plane of the ocular lens axes.

The viewers are each supplied with light impervious cloth tubes 26 which are clipped over the ocular frames 31 by means of spring clips 27. These flexible cloth tubes do not interfere with the above described adjustability of this device and do afford a clearer view of the oculars 32 by excluding all interfering extraneous light.

It can be readily seen, therefore, that the present invention comprises a headrest for binocular instruments, which, once properly positioned on such an instrument with its viewing apertures 20 symmetrically positioned with respect to the oculars 32 of the instrument, can be properly adjusted by the observer for his maximum comfort and optimum eye position, and substantially insures a proper and consistent observation of the oculars with the possibility of error due to improper positioning of the eyes with respect to the oculars reduced to a minimum.

The foregoing description of this device presents a preferred embodiment thereof and modifications within the scope of this invention, as defined by the following claims, will be apparent to those skilled in the art.

What is claimed is:

1. A headrest for a binocular optical instrument comprising a first bracket, a base having a pivotal connection with said bracket, a second bracket pivotally mounted on said first bracket on an axis parallel to the first-mentioned pivotal axis, said base to be mounted on said instrument with said pivotal axes positioned substantially in a plane parallel to and with said axes extending at right angles to the axes of the ocular lenses, and with said second bracket disposed toward said lens axes, adjustable means on each of said brackets adapted to contact said instrument for pivotally moving said brackets about their pivotal axes, a pair of eyemasks for receiving the head of the user to facilitate sighting through the instrument oculars pivotally mounted on said second bracket on an axis extending at right angles to said bracket pivotal axes, pivoting of said first bracket about the first-mentioned pivotal axis resulting in movement of said eyemasks in a plane intersecting said ocular lens axes, pivoting of said second bracket about the second mentioned pivotal axis resulting in movement of said eyemasks along a plane which substantially parallels the plane of said ocular lens axes, the pivotal movement of said eyemasks with respect to the second bracket being in a plane substantially parallel to the plane of said ocular lens axes, and a linkage connecting said eyemasks for interlocked pivotal movement thereof, said brackets thereby facilitating adjustment of said eyemasks with respect to said oculars and pivotability of said eyemasks facilitating the accommodation thereof to the head of the user.

2. A headrest for a binocular optical instrument comprising a pair of pivotally mounted brackets, a base pivotally connected to one of said brackets on an axis parallel to the axis of the first-mentioned pivotal connection, said base to be mounted on said instrument with said brackets movable in a plane parallel with the axes of the lenses in the instrument oculars, a pair of eyemasks to facilitate sighting through the instrument oculars pivotally mounted on the other of said brackets on an axis disposed parallel with said plane, adjustable means on each of said brackets adapted to contact said instrument for pivoting said brackets about their pivotal axes to vary the position of said eyemasks along a line parallel to said lens axes and along a line transverse of said lens axes, pivotal movement of each of said eyemasks being in a plane substantially parallel with the plane of said lens axes, and a linkage interconnecting said eyemasks for synchronizing the pivotal movements thereof, said brackets thereby facilitating adjustment of said eyemasks with respect to the oculars of said instrument and the pivotability of said eyemasks facilitating the adjustment thereof in head of the user.

3. A headrest for a binocular optical instrument comprising mounting means, a supporting bracket, a link pivotally connected at spaced points to said means and to said bracket, the axes of said pivotal connections being parallel, eyemasks for receiving and conforming to the head of the user and each having an aperture therein for sighting therethrough, each of said eyemasks being pivotally mounted on said bracket on an axis at right angles to said first-mentioned axes, said mounting means to be secured to said instrument with said first-mentioned axes disposed in a plane substantially parallel to the plane of the axes of the lenses in the instrument oculars and the pivotal axes of said eyemasks being disposed substantially perpendicular to said plane, adjustable means on said link and on said bracket adapted to engage said instrument for supporting said link and bracket in fixed relation to said instrument, adjustment of said last mentioned means resulting in movement of said eyemasks along a line substantially parallel to and perpendicular to the plane of said lens axes, and means interconnecting said eyemasks for synchronizing the pivotal movements thereof.

LORUS J. MILNE.
ARTHUR J. RAWSON.
HALDAN K. HARTLINE.

References Cited in the file of this patent

UNITED STATES PATENTS

| Number | Name | Date |
|---|---|---|
| 1,916,678 | Malcom | July 4, 1933 |
| 2,187,542 | Hagen | Jan. 16, 1940 |
| 2,199,662 | Greaves | May 7, 1940 |
| 2,410,725 | Franklin | Nov. 5, 1946 |
| 2,436,576 | Kende et al. | Feb. 24, 1948 |
| 2,492,383 | Jones | Dec. 27, 1949 |
| 2,517,892 | Larrabee et al. | Aug. 8, 1950 |

FOREIGN PATENTS

| Number | Country | Date |
|---|---|---|
| 154,928 | Great Britain | Jan. 5, 1922 |
| 615,699 | Great Britain | Jan. 10, 1949 |